(12) United States Patent
Huang et al.

(10) Patent No.: US 11,269,671 B2
(45) Date of Patent: Mar. 8, 2022

(54) VIRTUAL MACHINE IMAGE MANAGEMENT USING DELTA TREES

(71) Applicant: VMware, Inc., Palo Alto, CA (US)

(72) Inventors: Xun Wilson Huang, Alameda, CA (US); Rachit Siamwalla, Foster City, CA (US); James M. Phillips, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/538,742

(22) Filed: Nov. 11, 2014

(65) Prior Publication Data

US 2015/0169355 A1 Jun. 18, 2015

Related U.S. Application Data

(63) Continuation of application No. 11/739,043, filed on Apr. 23, 2007, now Pat. No. 8,886,865.

(60) Provisional application No. 60/745,502, filed on Apr. 24, 2006.

(51) Int. Cl.
*G06F 9/455* (2018.01)
*G06F 3/06* (2006.01)

(52) U.S. Cl.
CPC .......... *G06F 9/45558* (2013.01); *G06F 3/061* (2013.01); *G06F 3/0604* (2013.01); *G06F 3/0608* (2013.01); *G06F 3/0665* (2013.01); *G06F 3/0676* (2013.01); *G06F 9/45533* (2013.01); *G06F 2009/45562* (2013.01); *G06F 2009/45583* (2013.01)

(58) Field of Classification Search
CPC .................. G06F 3/0665; G06F 2009/45562
USPC .............................. 711/6, 161; 717/122, 170
See application file for complete search history.

(56) References Cited

U.S. PATENT DOCUMENTS

| | | | |
|---|---|---|---|
| 6,397,307 B2 | 5/2002 | Ohran | |
| 7,093,086 B1 | 8/2006 | van Rietschote | |
| 7,320,009 B1 | 1/2008 | Srivastava et al. | |
| 7,428,636 B1 | 9/2008 | Waldspurger et al. | |
| 7,529,897 B1* | 5/2009 | Waldspurger et al. | ....... 711/162 |
| 8,296,759 B1 | 10/2012 | Hutchins et al. | |
| 8,886,865 B1* | 11/2014 | Huang et al. | ..................... 711/6 |
| 2004/0010787 A1 | 1/2004 | Traut et al. | |
| 2004/0210591 A1 | 10/2004 | Hirschfeld et al. | |
| 2006/0101189 A1 | 5/2006 | Chandrasekaran et al. | |

OTHER PUBLICATIONS

Vjb1. "Re: VMSNAP/VMRES User Guide," Jan. 5, 2005, http://communities.vmware.com/message/105461.
Andrew Warfield, Russ Ross, Keir Fraser, Christian Limpach and Steven Hand, "Parallax: Managing Storage for a Million Machines," Jun. 2005. Usenix. HotOS 2005.

(Continued)

*Primary Examiner* — Nathan Sadler

(57) ABSTRACT

Redo logs are used to facilitate efficient cloning of virtual machines. When a virtual machine with a virtual hard disk is to be cloned, two redo logs are created, both of which are linked to the virtual hard disk. The virtual machine being cloned is then linked to one redo log, and a newly created virtual machine is linked to the other. Each time an additional virtual machine is created, two new redo logs are created and linked to the end of the disk chain. The parent and newly created virtual machine are each linked to one of the new redo logs.

20 Claims, 13 Drawing Sheets

(56) References Cited

OTHER PUBLICATIONS

Michael A. Penhallurick, "Methodologies for the use of VMware to book cloned/mounted subject hard disk images," Mar. 2005. Cranfield University.
Vmware, "Using VMware ESX Server System and VMware Virtual Infrastructure for Backup, Restoration, and Disaster Recovery," Nov. 2005. VMware.
Microsoft Press. Microsoft Computer Dictionary. Mar. 2002. Microsoft Press. p. 600.
Joshua P. MacDonald, "File System Support for Delta Compression," May 2002, http://www.xmailserver.net/xdfs.pdf.

* cited by examiner

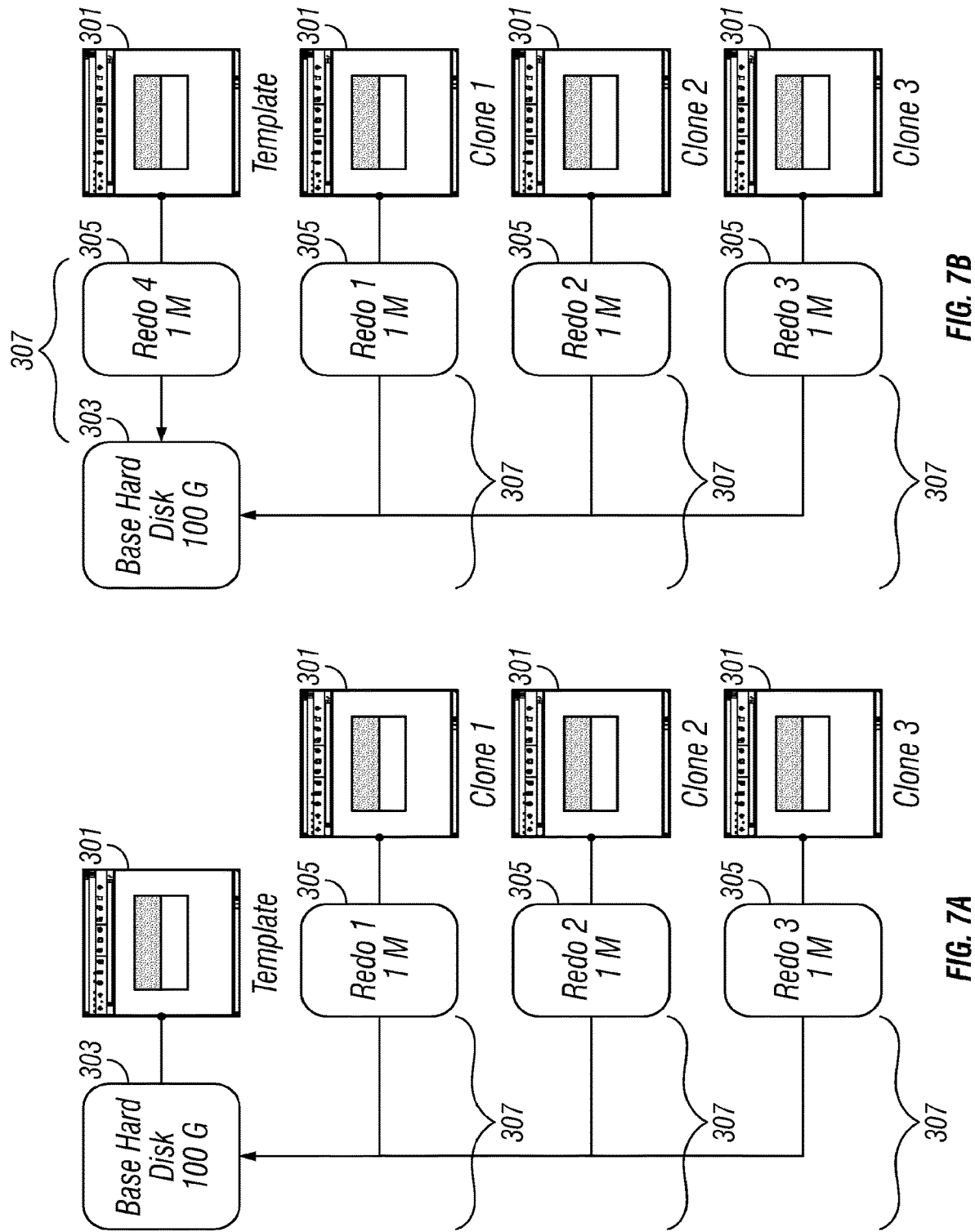

VIRTUAL MACHINE IMAGE MANAGEMENT USING DELTA TREES

PRIORITY CLAIM AND RELATED APPLICATION

This patent application is a Continuation of U.S. patent application Ser. No. 11/739,043 filed Apr. 23, 2007, issued as U.S. Pat. No. 8,886,865, which claims the benefit of provisional application Ser. No. 60/745,502, titled "Virtual machine Image Management Using Delta Trees," filed on Apr. 24, 2006, the entirety of which is hereby incorporated by reference.

TECHNICAL FIELD

This invention pertains generally to virtual computing, and more specifically to efficiently managing virtual machine images such as virtual hard disks.

BACKGROUND

Virtualization technologies such as VMware and Microsoft Virtual Server are becoming prevalent in the market place. These technologies provide a virtual hardware abstraction to guest operating systems, and allow them to run as applications (virtual machines) in a functionally isolated environment on a host computer without being modified. Virtualization allows multiple virtual machines to run on a single physical server (host computer) simultaneously, providing functional and performance isolation for processor, memory, storage, etc. among the multiple instances of virtual machines. It is common to duplicate a base virtual machine, sometimes making many copies.

Like physical machines, virtual machines have storage media such as hard disks (virtual hard disks, in the case of virtual machines), along with other peripheral devices. Typically, a virtual machine's virtual hard disk is used to store the base operating system, application programs and application data.

Typically, when a virtual machine hard drive is created, one of two methods are used. According to the pre-allocated disk method, space is allocated up front for all the disk space required for the virtual hard disk. Under the sparse disk method, the initial hard disk contains only meta-data but not the actual data, and the hard disk size grows as data is written to the hard disk. Upon creating an empty virtual hard disk, an operating system and application program can be installed, and the hard disk can be put into a state ready for duplication.

Operating systems are quite large. For example, abase installation of Window 2000 requires 600 megabytes, Windows Vista requires up to 15 gigabytes and RedHat Linux 4 requires 200 megabytes to 4 gigabytes. Thus, common virtual machine disk sizes are from tens to hundreds of gigabytes. Due to their large size, virtual hard disks make virtual machines difficult and time-consuming to manage, duplicate, replicate, backup, move and deploy.

For example, suppose we have a virtual machine A with hard disk 1, and we want to create an identical copy of machine A to produce machine B with hard disk 2. The conventional method of duplicating the hard disk involves copying the existing hard disk bit by bit into a second virtual hard disk. This is time consuming, and requires at least the same amount of disk space as the original hard disk. FIG. 1 illustrates the duplication of a virtual machine, according to this conventional method. As illustrated, Machine A and 100 gigabyte Hard Disk 1 are copied to Machine B and 100 gigabyte Hard Disk 2.

Both VMware and Microsoft virtualization technology support Redo logs for virtual hard disks. As illustrated in FIG. 2, Redo logs capture the differences between a specific base state of a hard disk and subsequent modifications made to that hard disk. The behavior of a Redo log is that write operations to a disk block are routed to the Redo log. Read operations on a disk block read the block from the Redo log if the block exists in the Redo log. Otherwise, the read operation attempts to read from the parent disk. However, when copying (or otherwise manipulating) virtual hard disks with Redo logs, the base virtual hard disk and all associated Redo logs have to be copied (or otherwise processed).

What is needed are methods, computer readable media and computer systems for more efficiently copying and otherwise processing virtual hard disks.

SUMMARY OF INVENTION

Redo logs are used to facilitate efficient cloning of virtual machines. When a virtual machine with a virtual hard disk is to be cloned, rather than copying the underlying virtual hard disk, two redo logs are created, both of which are linked to the virtual hard disk. The virtual machine being cloned is then linked to one redo log, and a newly created virtual machine is linked to the other. Since both redo disks are linked to the underlying virtual hard disk, the original and the new virtual machines both have access to the same data, yet that data did not need to be copied. Each time an additional virtual machines is created, two new redo logs are created, both of which are linked to the last node of the disk chain of the parent virtual machine. The parent virtual machine is linked to one of the new redo logs, and the new virtual machine to the other. Thus, many virtual machines can be created from a single template, without requiring the copying of the underlying stored data.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIGS. 7A-B illustrate an embodiment of the present invention in which a Redo disk is not created for a template virtual machine during a clone operation, but instead is only created prior to the modification of the template virtual machine.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
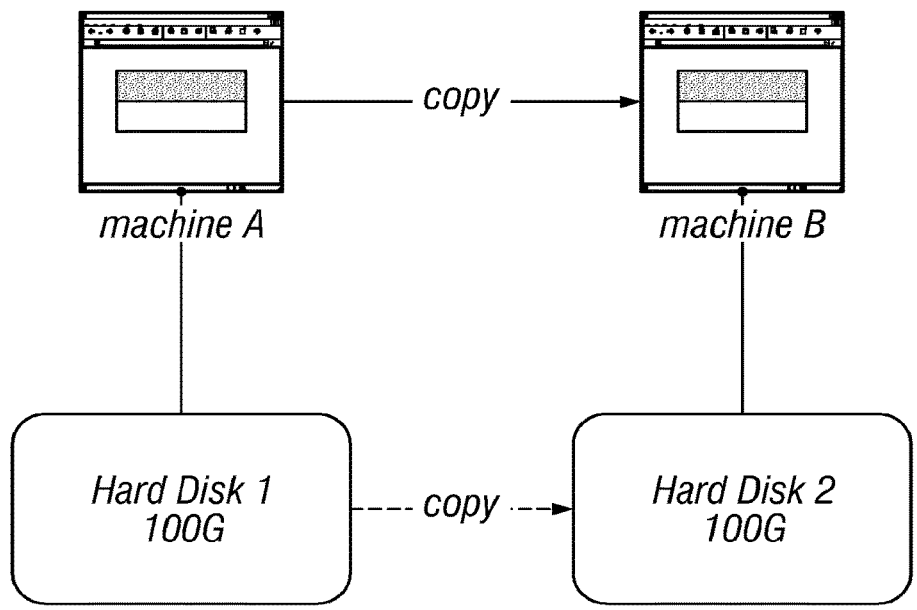
FIG. 1 is a block diagram illustrating a conventional methodology for copying a virtual machine.
Figure 2:
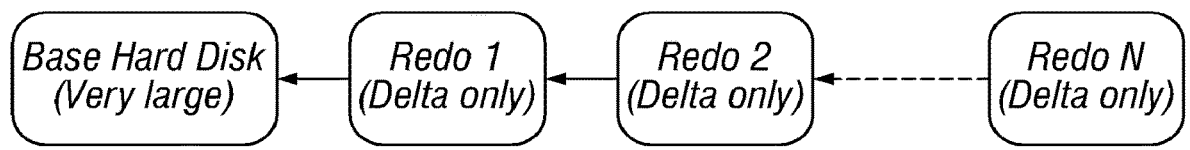
FIG. 2 is a block diagram illustrating conventional virtual machine Redo logs.
Figure 3A:
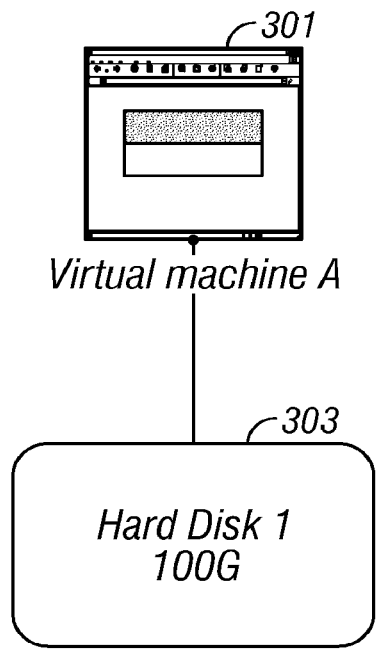
FIGS. 3A-B are block diagrams illustrating the use of Redo disks in the copying of virtual machines, according to some embodiments of the present invention.
Figure 3B:
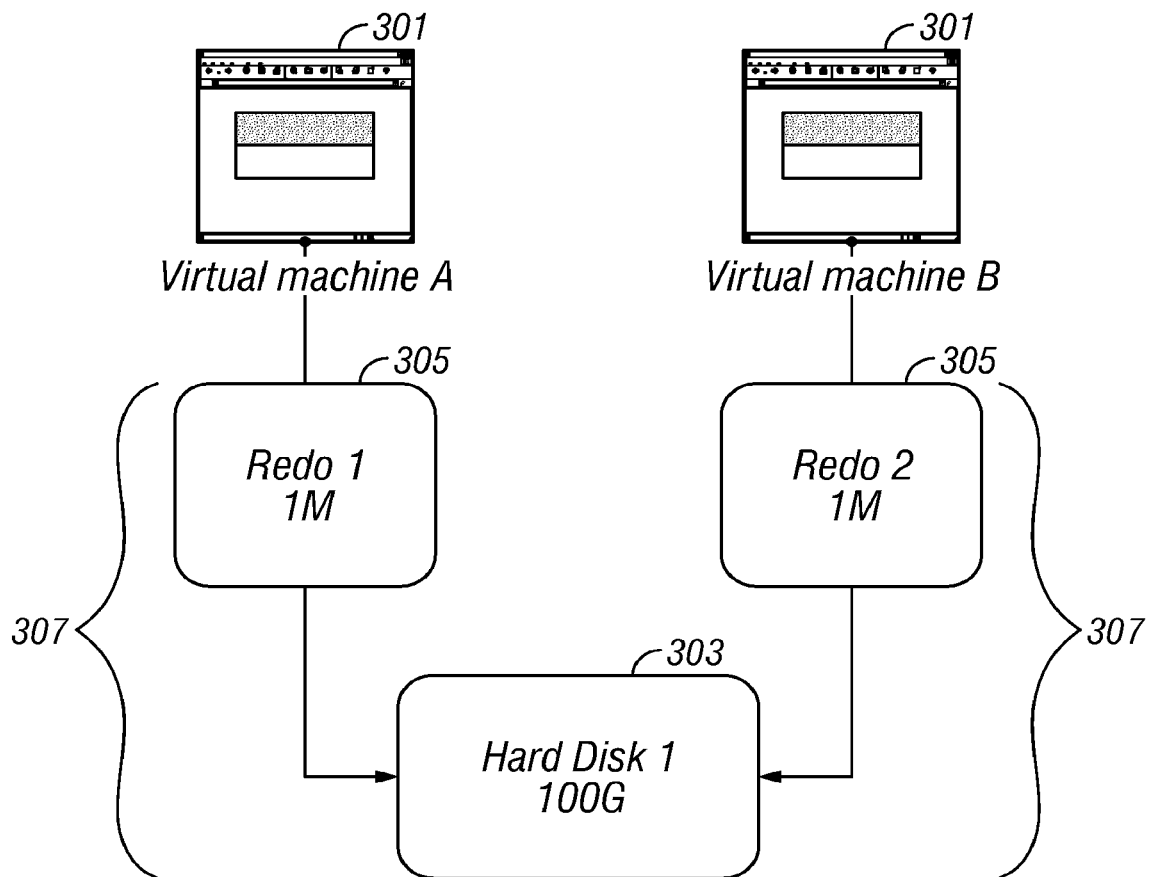

FIGS. 3A-B illustrate the cloning of a virtual machine 301 including an associated virtual hard disk 303 according to some embodiments of the present invention. The procedure for creating an initial virtual hard disk 303 is the same as creating a virtual hard disk 303 using, for example, VMware or Microsoft virtualization technology. The virtual hard disk 303 can be sparse or of a pre-allocated size, as desired. Some embodiments of the present invention use sparse disks, which are typically more space efficient and take less time to create. However, other embodiments use pre-allocated disks.

As illustrated in FIGS. 3A-B, some embodiments of the present invention leverage the Redo log 305 mechanism to duplicate virtual machines 301. This enables better management of a large number of virtual machines 301 in a scalable manner, such that it is fast and easy to manipulate many virtual machines 301. As illustrated in FIG. 3A, Virtual Machine A 301 has a base 100 gigabyte virtual hard disk 303 (Hard Disk 1). Turning now to FIG. 3B, in order to copy virtual machine A 301 and its 100 gigabyte virtual hard disk 303 (Hard Disk 1), two one megabyte Redo disks 305 (Redo disk 1 and Redo disk 2) are created, both of which are linked to Hard Disk 1. A Redo disk 305 simply comprises a Redo log provided by the underlying virtualization technology, used as a disk as described herein. Virtual Machine A 301 is linked to Redo disk 1 and Virtual Machine B 301 is linked to Redo disk 2. Of course, the given disk sizes (one megabyte for each Redo disk 305 and 100 gigabytes for the virtual hard disk 303) are simply examples, in order to illustrate that the underlying hard disk 303 can be very large, whereas Redo disks 305 are typically quite small, comparatively.

The cloning of Virtual Machine A 301 results in a single underlying Hard Disk 303 (Hard Disk 1), which is pointed to by both Virtual Machine A's Redo disk 305 and Virtual Machine B's Redo disk 305. Thus, Virtual Machine A's virtual hard disk comprises the chain 307 of Redo disk 1 and Hard Disk 1, whereas Virtual Machine B's virtual hard disk comprises the chain 307 of Redo disk 2 and Hard Disk 1.

It is to be understood that the creation of a Redo disk 305 is very fast because it is an O(1) operation relative to the size of the hard disk. Because the above described virtual machine 301 cloning operation does not involve copying Hard Disk 1 bit-by-bit, almost 100 gigabytes of space is saved, as well as the extensive time it would take to copy all that data. Nonetheless, both Virtual Machine A 301 and Virtual Machine B 301 have identical semantic access to the contents Hard Disk 1 after duplication.

Figure 4:
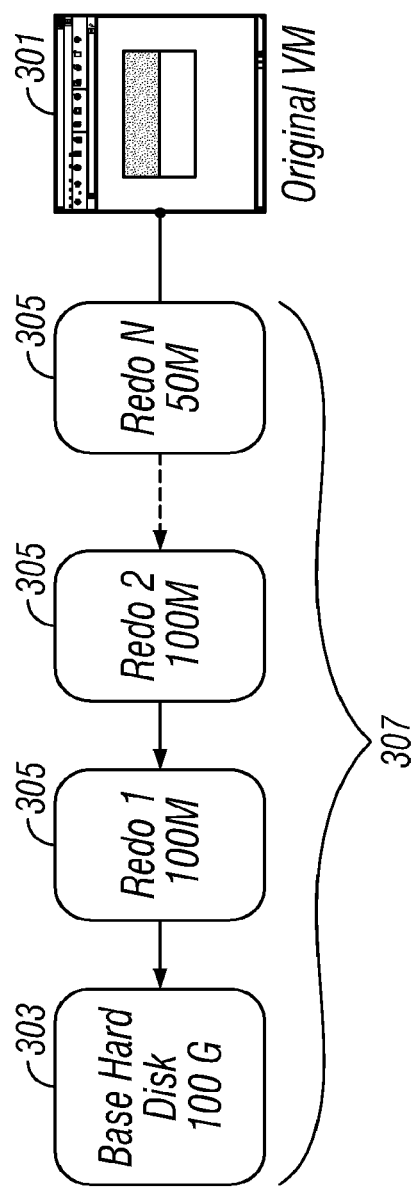
FIG. 4 illustrates a virtual machine with a long virtual disk chain, according to some embodiments of the present invention.
Figure 5:
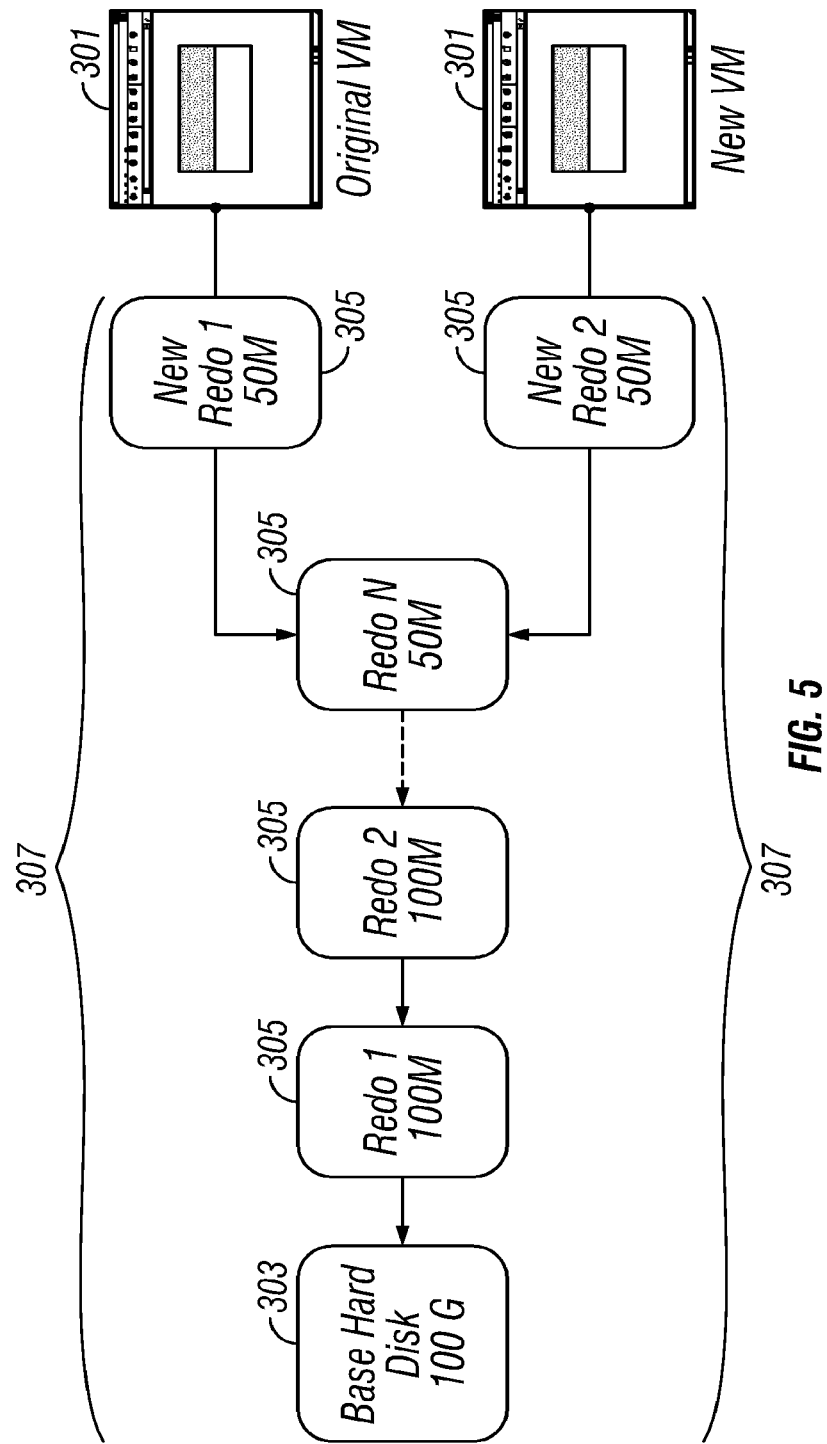
FIG. 5 illustrates the use of Redo disks in the copying of a virtual machine with a long virtual disk chain, according to some embodiments of the present invention.

As illustrated in FIGS. 4 and 5, subsequent duplication can be executed in a similar manner, in which new Redo disks 305 can be linked to a chain 307 comprising an existing virtual hard disk (e.g., a chain 307 of an underlying hard disk 303 and one or more Redo disks 305). To create a clone of the Original Virtual Machine 301 referencing Redo disk N (the Original Virtual Machine 301 and its chain 307 are illustrated in FIG. 4), two new Redo disks 305 are created. As illustrated in FIG. 5, both of these new Redo disks 305 are linked to Redo disk N. The Original Virtual Machine 301 is linked to one of the new Redo disks 305, and the New (cloned) Virtual Machine is linked to the other. Thus, each virtual machine 301 has access to the same virtual hard drive chain 307, except that the last link in each virtual machine's 301 chain 307 is a separate Redo disk 305.

Despite the tremendous advantages, using Redo disks 305 in the cloning of virtual machines 301 as described above can cause some negative performance impact for disk read operations. For example, when a disk block to be read exists only in the underlying virtual hard disk 303 at the top of a disk chain 307, a read operation will need to traverse the entire disk chain 307 to reach the base disk 303. Traversing every block of a disk chain 307 is an expensive operation, and thus it is desirable to keep disk chains 307 short.

Figure 6A:
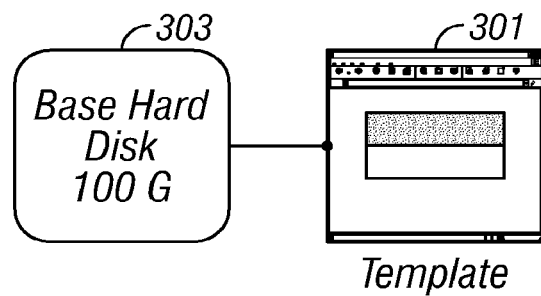
FIGS. 6A-D illustrate the progressive lengthening of a virtual disk chain as a virtual machine is copied multiple times, according to some embodiments of the present invention.

FIGS. 6A-D illustrate how disk chains 307 can be unduly long where a single virtual machine 301 is cloned many times. In such a situation, each clone operation results in a chain 307 one block (i.e., Redo disk 305) longer than its source. As FIG. 6A illustrates, it is often desirable to have a base "template" virtual machine 301. A template virtual machine 301 is initially setup with an operating system and applications, is rarely modified thereafter, and can be used as a base from which to make multiple clone virtual machines 301.

Figure 6B:
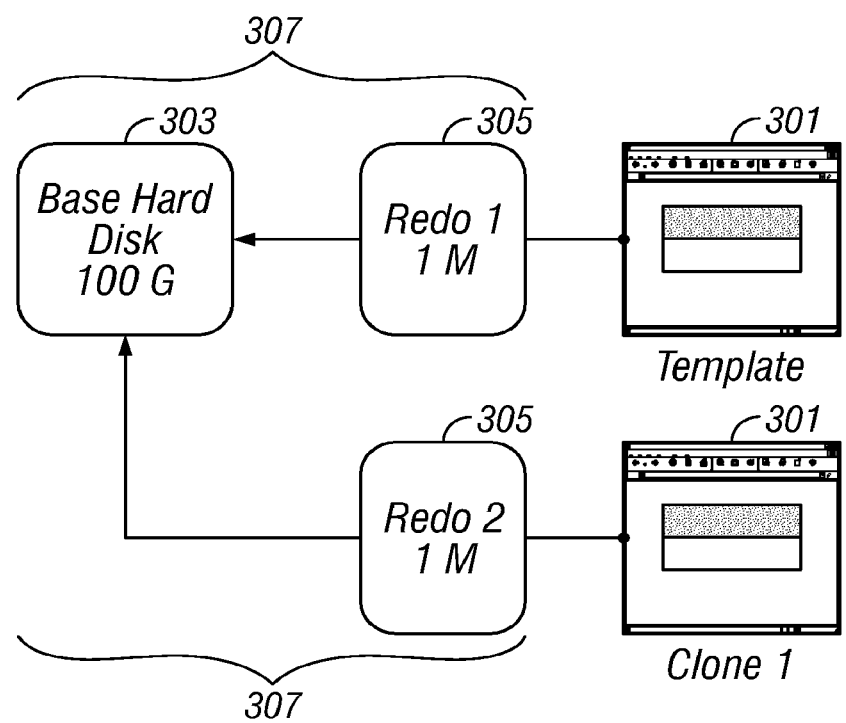

FIG. 6A depicts the original template virtual machine 301 with its 100 gigabyte base hard disk 303. FIG. 6B shows the results of a single clone operation, after which the template virtual machine 301 and the cloned virtual machine 301 (Clone 1) now each have a disk chain 307 comprising two blocks, the base hard disk 303 and a single Redo disk 305. As explained above in conjunction with FIG. 3, these Redo disks 305 are utilized so that the source virtual machine 301 (the template in this example) can be copied without the need to copy the underlying large hard disk 303.

Figure 6C:
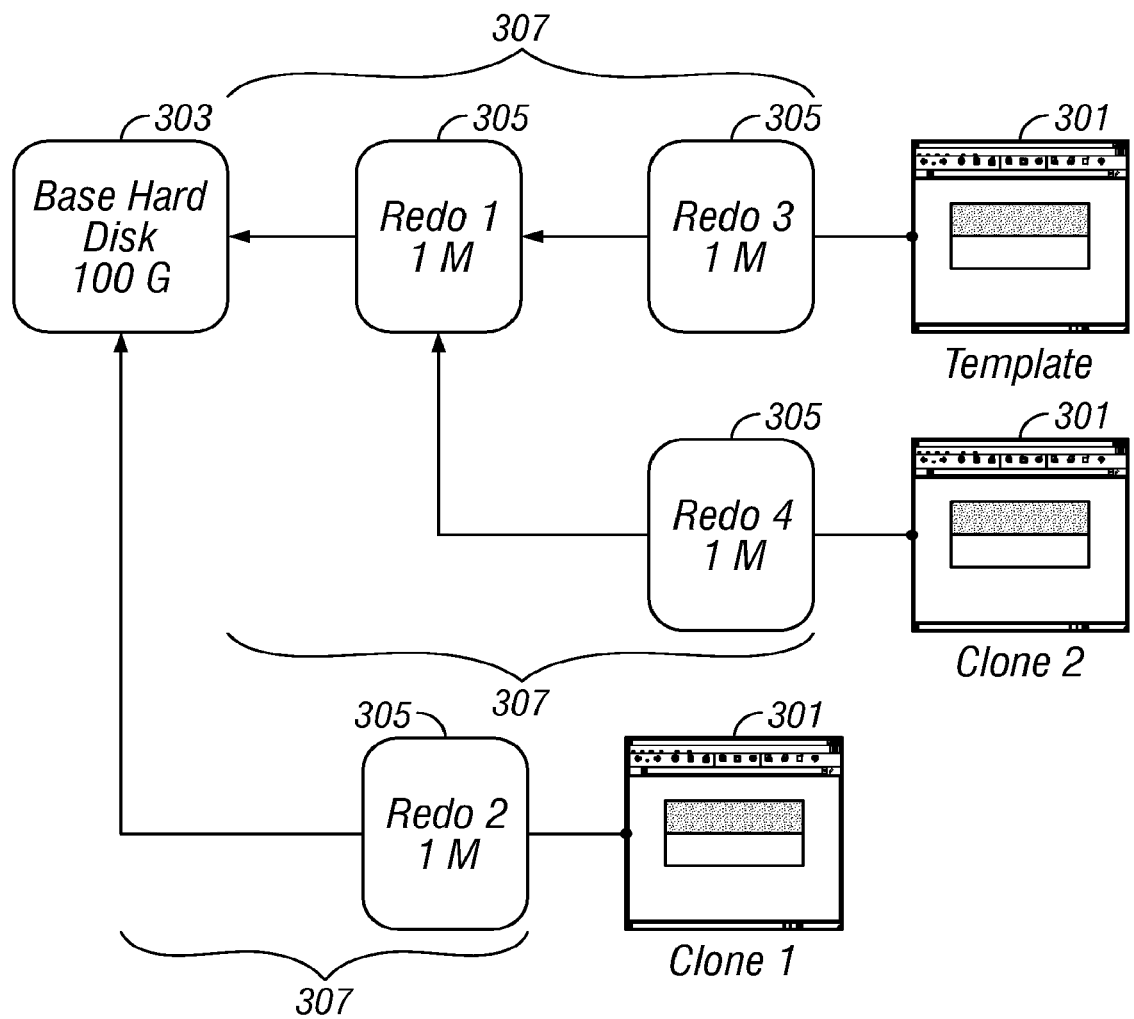
Figure 6D:
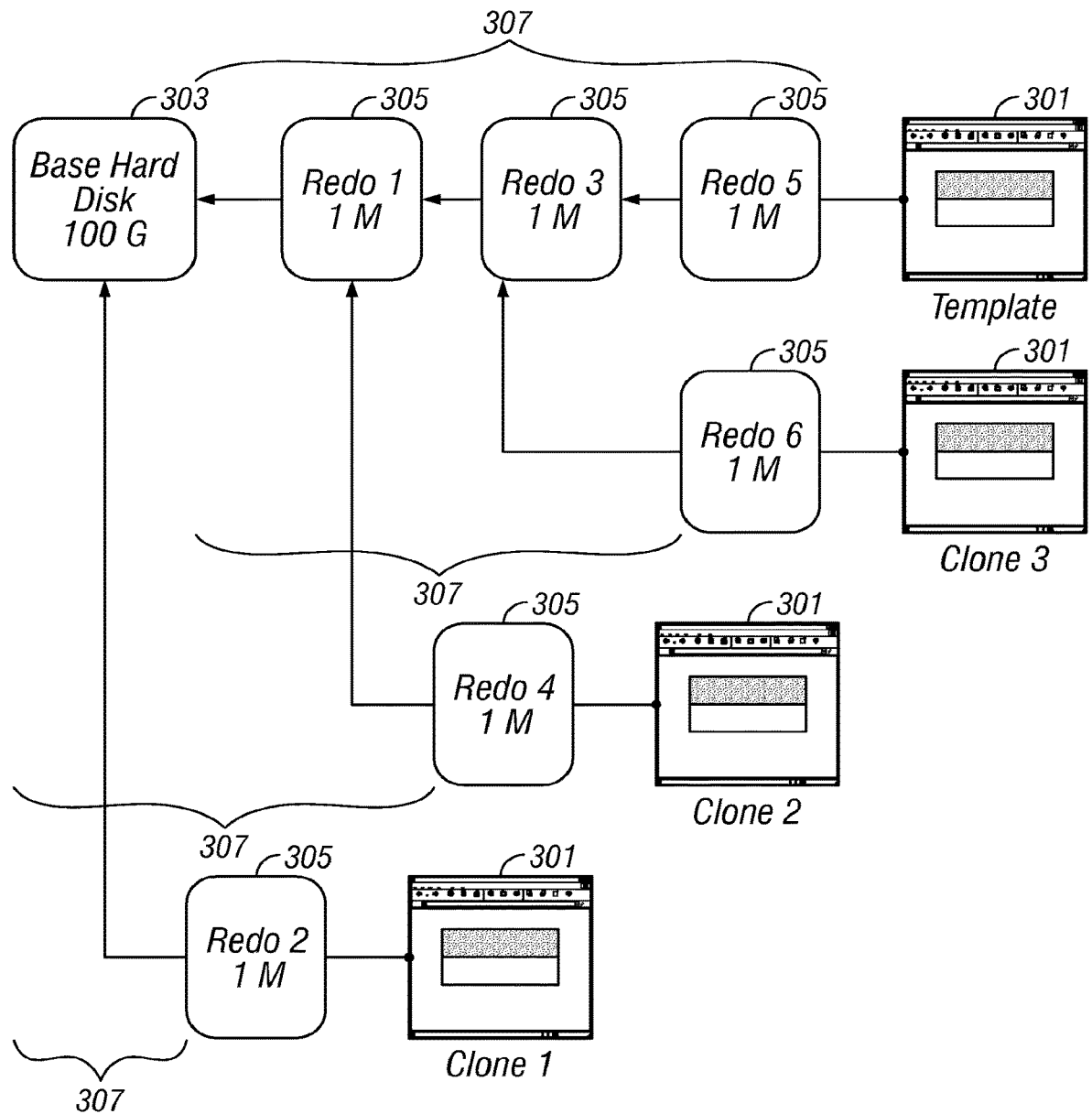

As illustrated in FIG. 6C, after a second clone operation, both the template virtual machine 301 and the second clone virtual machine (Clone 2) now have a three block disk chain 307. The clone operation creates a new Redo disk 305 for the source virtual machine 301 (template) and the cloned virtual machine 301 (Clone 2). These new Redo disks are illustrated in FIG. 6C as Redo 3 (for the template) and Redo 4 (for Clone 2). The new Redo disks 305 in turn point to original disk chain of the source virtual machine 301 (the template)

prior to the clone, which in this example comprises Redo 1 and the base hard disk 303. As depicted by FIG. 6D, after making yet another clone of the template virtual machine 301, the resulting disk chain 307 of the template and the newly cloned virtual machine 301 (Clone 3) is even longer, as yet another set of Redo disks 305 (Redo 5 and Redo 6) are added to facilitate the clone operation.

In some embodiments of the present invention, in order to address the potential performance degradation associated with long chains 307, the cloning procedure is modified for virtual machines 301 that are infrequently modified or read-only. More specifically, according to some embodiments of the present invention, in such instances Redo disks 305 are not created for a source virtual machine 301 such as a template during a clone operation. Instead, a Redo disk 301 for the template virtual machine 301 is only created prior to actually modifying the template virtual machine 301. Because the template virtual machine 301 is seldom or never modified, this strategy can result in much shorter disk chains 307.

To illustrate such an embodiment, suppose a template virtual machine 301 has one large (e.g., 100 gigabyte) virtual hard disk as illustrated in FIG. 7A. Each time the template virtual machine 301 is cloned (three times in the illustrated example), a Redo disk 305 is created for and associated with each clone virtual machine 301 (as illustrated, Clones 1, 2 and 3 are associated with Redo disks 1, 2 and 3 respectively). These Redo disks 305 all point to the base virtual hard disk 303 of the template virtual machine 301. Because it can be assumed that the underlying template virtual machine 301 is not to be modified frequently, a new Redo disk 305 is not created for the template 301 each time it is cloned. Thus, the disk chain 307 of each clone virtual machine 301 is only two blocks long, as illustrated. This is a significant improvement in chain 307 length over the approach illustrated in FIGS. 6A-D. In this embodiment, if the template virtual machine 301 is to be modified, a Redo disk 305 (Redo 4) for the template 301 is created, as illustrated in FIG. 7B.

In another embodiment, new Redo disks 305 are only created and added to the corresponding disk chains 307 during a clone operation if the last disk in the chain is sufficiently large. Where the bottom node of the chain 307 (i.e., the last Redo disk 305 in the chain 307 or the base hard disk 303 itself in a chain 307 of one block) is small enough (e.g., 10 megabytes), the advantages gained from creating new Redo disks 305 are not as compelling. Where the disk size is small enough, it is almost as fast to copy the disk as it is to make the set of new Redo disks 305, and the storage space saving realized by creating the new Redo disks 305 is negligible.

Figure 8A:
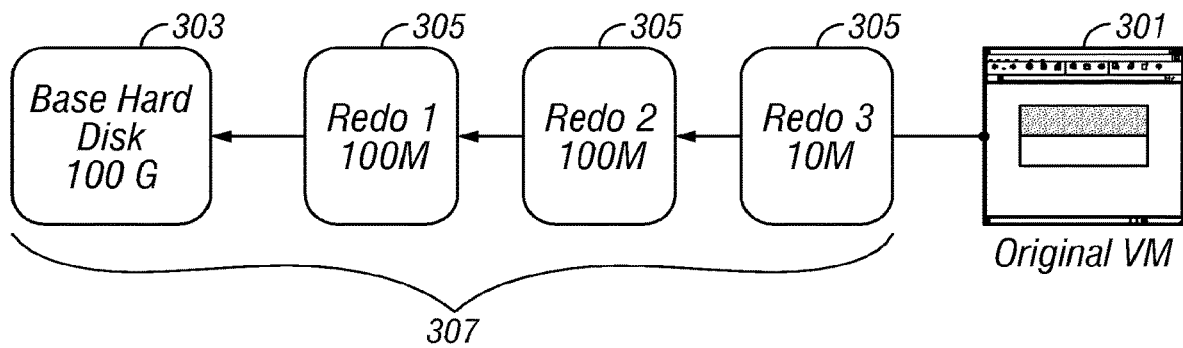
FIGS. 8A-B illustrate an embodiment of the present invention in which new Redo disks are only created and added to the corresponding disk chains during a clone operation if the last disk in the chain is sufficiently large.
Figure 8B:
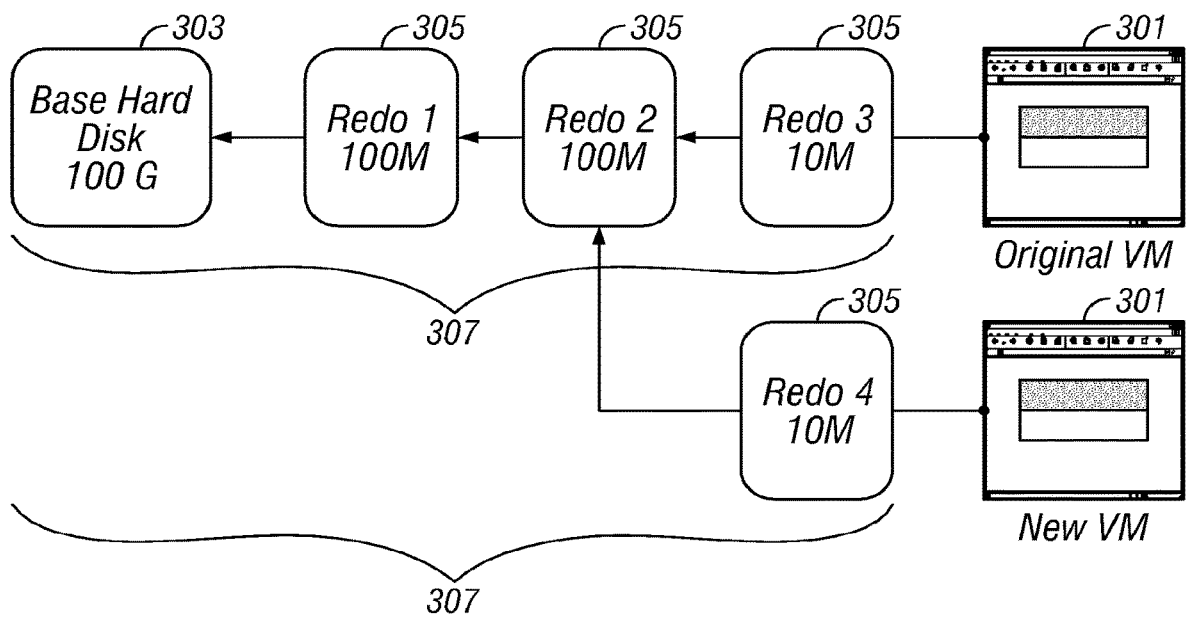

For example, turning to FIG. 8A, a virtual machine 301 (Original VM) is illustrated with a disk chain 307 in which the bottom block comprises a ten megabyte Redo disk 305 (Redo 3). As illustrated in FIG. 8B, in order to clone the source virtual machine 301 (Original VM), rather than creating a set of new Redo disks 305, the last disk in the chain 307 (Redo 3) is copied to Redo 4, which is associated with the new virtual machine 301 (New VM).

Thus as per FIGS. 8A-B, in some embodiments of the present invention, a threshold value is established (e.g., is system stocked or supplied and/or edited by a user, system administrator or the like), such that if the size of the last leaf node (the disk at the bottom of the chain 307) is greater than the threshold value, two new Redo disks 305 are created when copying a virtual machine. Where the size of the last leaf node does not exceed the threshold, the last leaf node is copied during a clone operation. It is to be understood that the actual threshold value to use is a variable design parameter.

It is to be understood that the underlying virtualization technology has limits on how long a disk chain 307 can be. For example, in current versions of VMware, the maximum chain length is 32. Therefore, when the length limit of the underlying virtualization technology is reached, clone operations always resort to copying the last disk in the chain 307, as opposed to creating new Redo disks 305.

Figure 9:
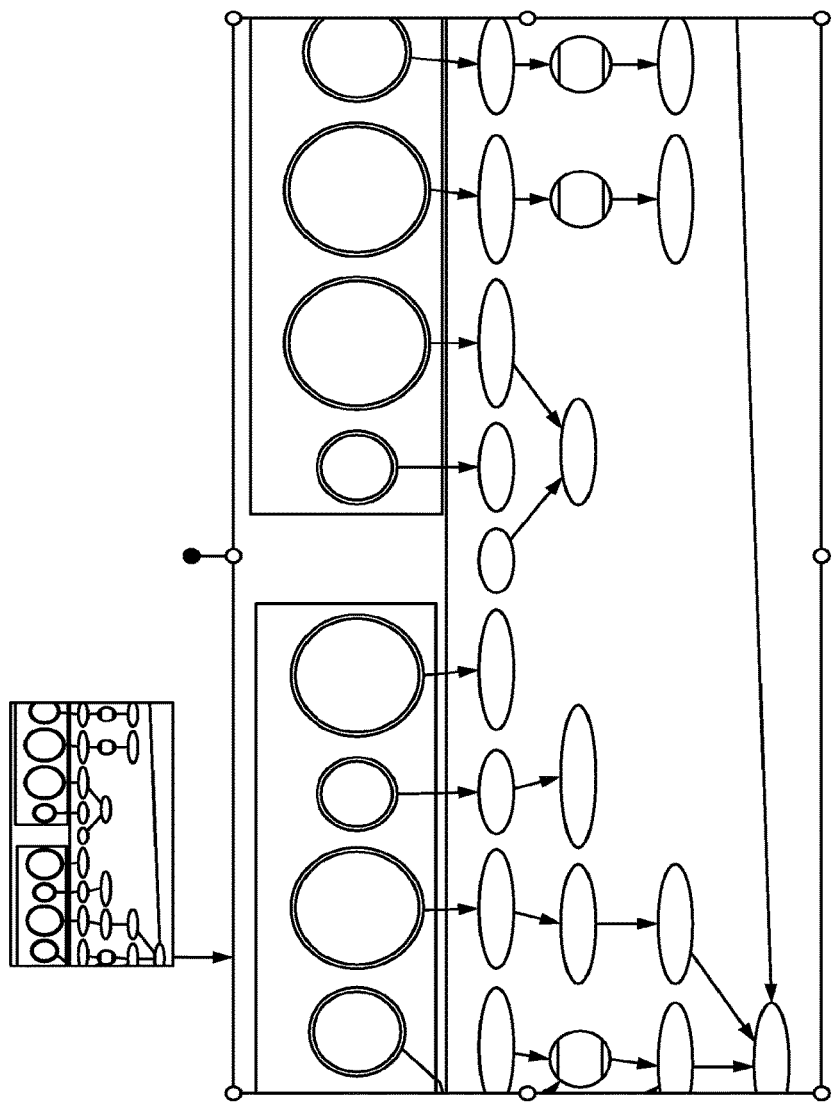
FIG. 9 illustrates a complicated hierarchy of virtual machines resulting from the execution of multiple clone operations over a period of time, according to some embodiments of the present invention.

As illustrated in FIG. 9, as multiple clone operations are executed over a period of time, the system can grow into a dense forest of virtual machines 301 with their associated disk chains 307. The management of such a "forest" can be a very daunting task for a user. Hence, some embodiments of the present invention provide a user interface (not illustrated) which hides the details of the cloned virtual machines 301 and their complicated disk chains 307 from the user. In such an embodiment, the user can simply refer to given virtual machines 301 (e.g., by name), and all of internal clone operations and disk linking are hidden from the end user.

Figure 10:
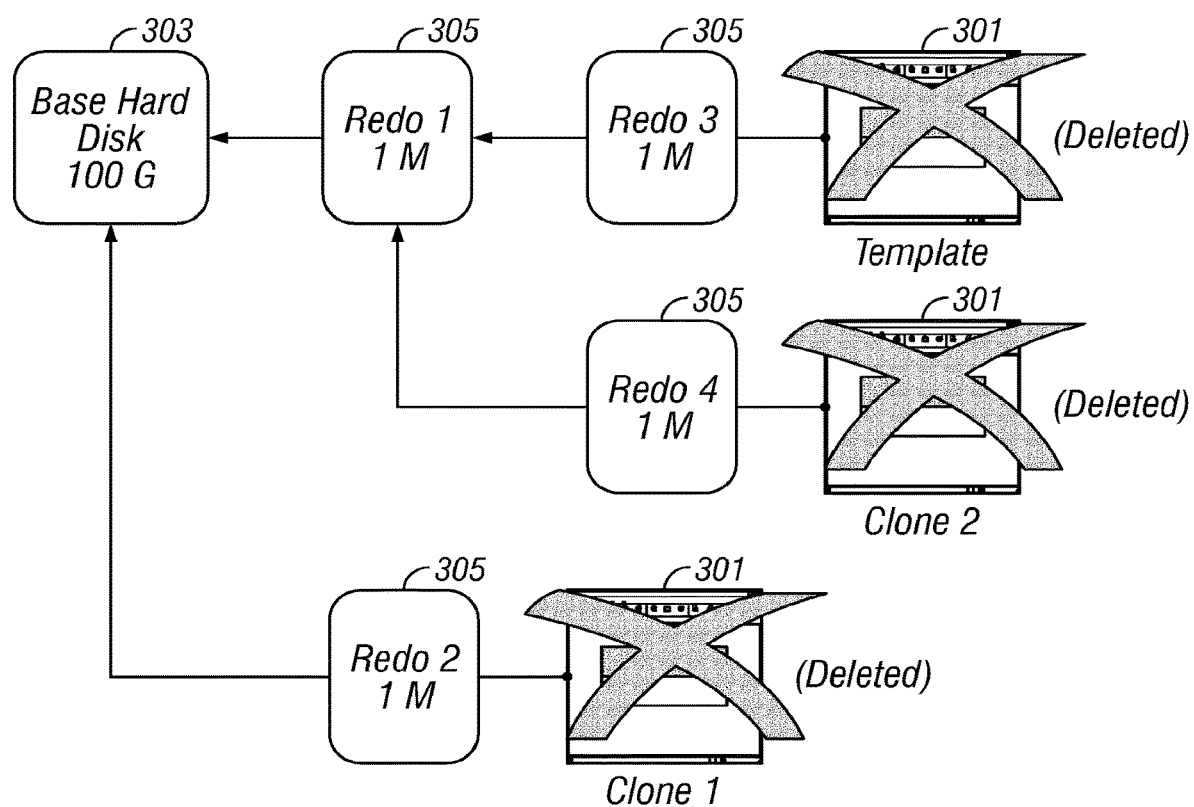
FIG. 10 illustrates non-referenced disk chains to be deleted, according to some embodiments of the present invention.

As virtual machines 301 can be added and deleted from the system, some embodiments of the present invention utilize garbage collection to clean up virtual hard disks 303, Redo disks 305 and disk chains 307 that are no longer being referenced or accessed. Referring to FIG. 10, an example is illustrated. Three virtual machines 301 (Template, Clone 1 and Clone 2) have been deleted from the system. The base virtual hard disk 303 and all of the Redo disks 305 associated with these deleted virtual machines 301 are left in the system. This is undesirable because no virtual machine 301 references these disks any more, so they are now a waste of space and resources. Hence, these non-referenced disks should be deleted.

In one embodiment, non-referenced disks are deleted by traversing all disk chains 307 in the system recursively. This operation resolves dependencies, locates unreferenced entries (i.e., virtual hard disks 303 and Redo, disks 305 that are not being referenced by any virtual machine 301) and deletes them. The operation is performed recursively because deleting a dead node (i.e., an unreferenced disk) can "kill" other nodes pointed to by the dead node. This garbage collection process typically runs in the background. After execution of the garbage collection process, each remaining disk is referenced by at least one virtual machine 101 in the system.

Figure 11:
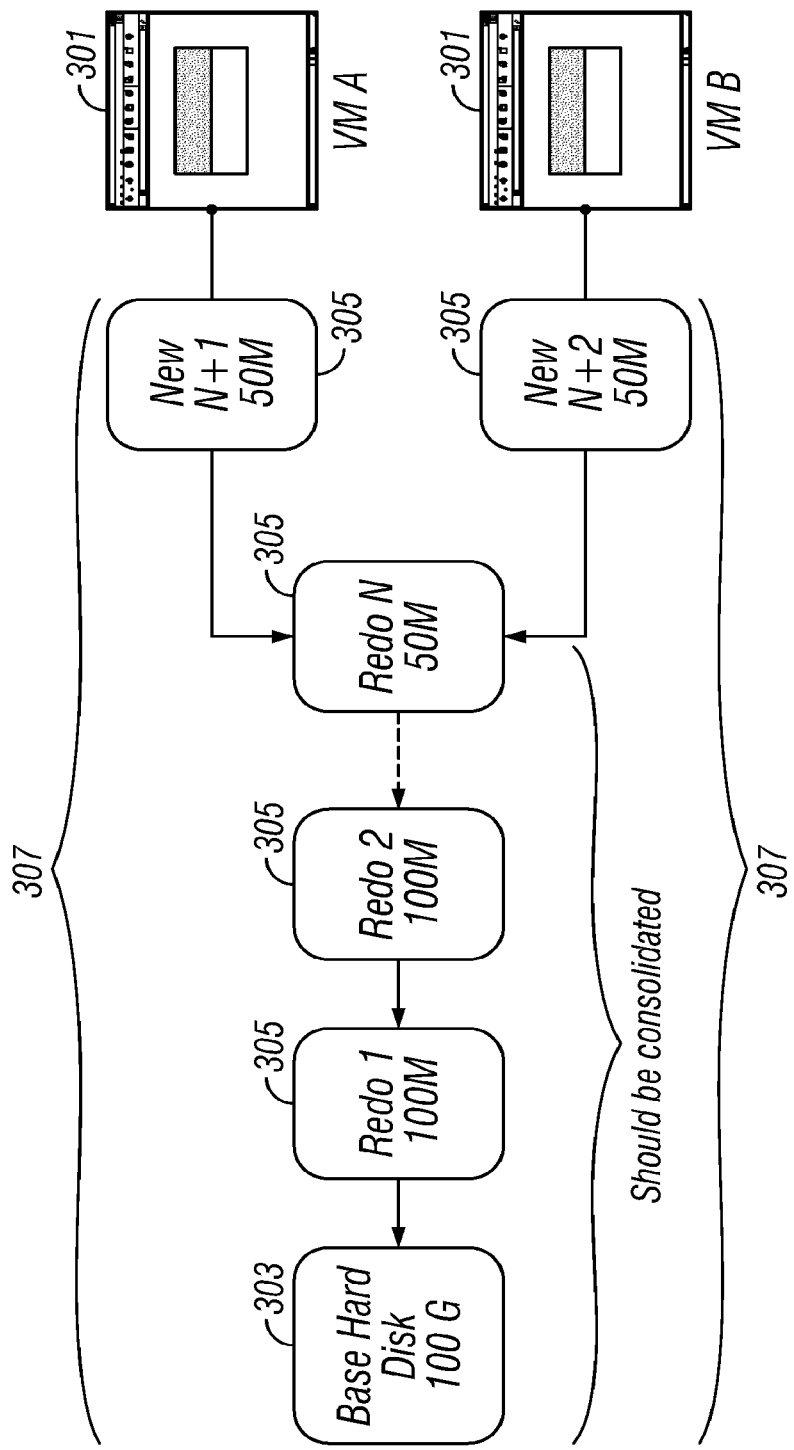
FIG. 11 illustrates disk chains to be consolidated, according to some embodiments of the present invention.

In some embodiments, a consolidation operation is also used for additional optimization, as illustrated in FIG. 11. As described above, as the system grows into a "forest," the garbage collection process can continue to purge the forest for unreferenced disks. This results in stable "trees" (i.e., chains 307) where every leaf node has a reference, with no dead leaf in the system. However, such a tree may not be the most optimal or canonical tree structure. Consider the structure illustrated in FIG. 11. Redo disk N is only referenced by Redo disk N+1 and Redo disk N+2, and the base hard disk 303 is only referenced by Redo disk 1. In effect, the base hard disk 303 and Redo disk 1 can be consolidated into a single node and still provide the same semantics for the two referencing virtual machines 301 (VM A and VM B). This consolidation operation reduces the chain 307 length as well potentially saving space, as the base disk 303 and Redo disk 1 may have overlapping disk blocks. By applying the same logic to Redo disks 2 to Redo disk N, the entire chain 307 between the base hard disk 303 and Redo disk N can be consolidated into a single virtual hard disk 303.

The logic for determining which blocks should be consolidated according to one embodiment is illustrated by the pseudo-code in Table 1:

TABLE 1

```
Foreach node in VMForest {
    If node has only one child {
        Combine(node, node.child) → Node
        For all child of node.child {
            Child.parent = node
        }
    }
}
```

Figure 12:
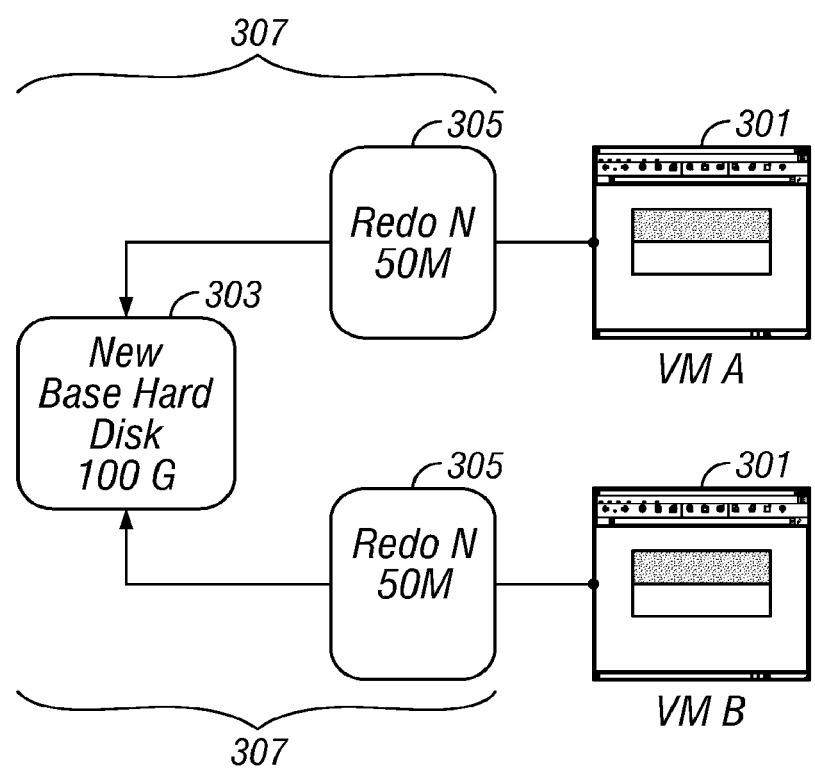
FIG. 12 illustrates consolidated disk chains, according to some embodiments of the present invention.

It is to be understood that the pseudo-code of Table 1 is an example of the type of consolidation logic that can be applied. Variations will be readily apparent to those of ordinary skill in the relevant art in light of this specification. Such variation are within the scope of the present invention. The execution of the consolidation operation creates a new base virtual hard disk 301, and thus the chain 307 length is greatly reduced, as illustrated in FIG. 12.

In some embodiments, virtual machine images (the forest) are stored on centralized file servers (not illustrated). This is known as direct mode. When a virtual machine 301 executes in direct mode, virtual hard disks 303 on the file servers are accessed directly across the network. Because it is not necessary in direct mode to copy the hard disk pieces over the network at start-up, direct mode provides a fast power on operation. However, as the disk read/write operations occur over the network, on-going disk operations are slower than equivalent local operations, and the performance can be impacted by other traffic in the network.

In other embodiments, virtual machines 301 execute in cached mode. In cached more, virtual machine 301 disk chains 307 are copied to the local physical servers prior to execution. Thus, the start-up time is longer than in direct mode, because the virtual machine 301 images need to be transferred across the network. However, once the virtual machines 301 are running, their disk read/write operations are local and isolated from network traffic (and hence faster).

The Redo disk 305 methodology of the present invention lends itself well to cached mode, as after a few rounds of cached execution virtual machine 301 disk chains 307 start becoming available at the physical server. Subsequent transfers of a virtual machine 301 only need to transfer the part of the chain 307 that is not already on the host. In addition, after a user is done with a virtual machine 301 and wishes to undeploy it, he only needs to transfer the last Redo disk 305 back to the file server, instead of having to copy back the large base virtual disk 303.

Cached mode can be implemented using any caching algorithm, such as the well known LRU algorithm (Least Recently Used), along with information about the tree hierarchy, to remove nodes when the cache becomes full.

Various embodiments of the present invention such as those described in detail above have many uses and applications. For example, the present invention is well suited for creating multiple virtual machines 301 based on one or more template virtual machines 301. A template virtual machine 301 is a well defined virtual machine 301 that can be used as a blueprint for creating new virtual machines 301. Typically, the desired operating system and various relevant applications are installed and carefully configured on a template 301. Once properly configured, a template 301 is rarely modified. A large number of virtual machines 301 can be created based on the template 301, and by using the Redo disk 305 methodology of the present invention, a great deal of time and storage space are saved.

Creating virtual machines 301 from templates 301 is applicable to, e.g., the following scenarios: 1) developer and quality assurance departments creating virtual machines 301 based on known good templates 301; and 2) product demonstrations where the same demonstration virtual machine 301 is instantiated many times for different customers.

Another application that the present invention lends itself well to is the capturing of running virtual machines 301 into a library, for example when a running virtual machine 301 has reached a desired state. For example, suppose an enterprise site is preparing an environment for application installation. After all the requirements are satisfied, this environment will be used repeatedly going forward. Thus, the virtual machine 301 state can be captured and reused as desired. As another example, suppose a quality assurance team has encountered a difficult to catch bug in a virtual machine 301. It is desirable to capture the state of the virtual machine 301 for a developer to investigate, while at the same time the quality assurance group wants to continue with their testing.

In such scenarios, it is desirable to capture the entire state of the virtual machine 301, including the virtual hard disk 303 state. Instead of duplicating hard disks 303 by coping them, the clone operations according to present invention can be used, to save a reference to the relevant disk(s) without having to copy them. Subsequently, when a user wants to revert to the state stored in the library, he can use the clone technique described to create a Redo disk 305 for the virtual machine 301 in the library. This again will simply involve a reference to the large and expensive base hard disk 303, without having to duplicate actual stored content.

Another application in which the present invention can be used is the transferring of virtual machine 301 images between sites. Various embodiments of the present invention support the Akimbi Slingshot product lines, installed at different sites. These sites can exchange virtual machine 301 images between them. For instance; a user can request the transfer of a virtual machine 301 from site 1 to site 2.

As explained above, under the present invention virtual machine 301 hard disks are represented as a chain 307. Initially, all parts of the virtual machine 301 need to be transferred to site 2 to form a complete virtual machine 301 there. However, a subsequent transferred virtual machine 301 may have a parent virtual machine 301 disk chain 307 that overlaps with the disk chain 307 of an already transferred virtual machine 301, such that the overlapping parts are already available at the destination site. Therefore, under the present invention such transfers can be optimized by only transferring parts of a virtual machine 301 disk chain 307 that are not already available at the destination site.

This can be an important optimization as network bandwidth between sites is limited, especially between international sites. Virtual Machine 301 sizes can be very large, and reducing the size makes inter-site transfer far more feasible.

In general, various benefits result from the use of the present invention. Virtual machines 301 and their associated virtual hard disks 303 can become very large, and storing a full copy of every virtual machine 301 can be extremely expensive. Leveraging the techniques described above allows a virtual machine 301 to be stored by storing only the delta (difference) between it and a base virtual machine 301. This significantly reduces the storage requirement, and allows more virtual machines 301 to be created and stored on the same amount of storage media. This also makes operations such as backup more efficient.

Making copies of virtual machines 301 is not only space consuming, it is also time consuming. Making a copy of a 130 gigabyte hard disk 303 can take hours. Creating Redo disks 305 rather than actual disk copies makes every copy operation an O(1), regardless of the size of the virtual machine 301. This makes user experience in a dynamic environment such as a test or development platform much better, because virtual machines 301 can be created and deployed very quickly.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Accordingly, the disclosure of the present invention is intended to be illustrative, but not limiting, of the scope of the invention, which is set forth in the following claims.

What is claimed is:

1. A method comprising:
   determining that a virtual machine (VM) satisfies a set of requirements, the VM being linked to a base virtual disk, wherein the base virtual disk includes a chain of one or more virtual disks;
   based on the determining, identifying the VM as a template VM;
   receiving a request to clone the template VM to produce a second VM that is also linked to the base virtual disk;
   determining a size of a last virtual disk in the chain;
   when it is determined that the size of the last virtual disk in the chain is below a threshold:
      creating a new first virtual disk for the second VM by copying contents of the last virtual disk in the chain to the new first virtual disk without creating a new second virtual disk for the VM; and
      linking the second VM to the new first virtual disk;
   when it is determined that the size of the last virtual disk in the chain is above the threshold:
      creating the new first virtual disk for the second VM and creating the new second virtual disk for the VM; and
      linking the second VM to the new first virtual disk and the VM to the second new virtual disk.

2. The method of claim 1, wherein the new first virtual disk is positioned between the second VM and the base hard disk.

3. The method of claim 2, further comprising:
   creating the virtual disk for the second VM without copying contents of the base virtual disk.

4. The method of claim 1, wherein the one or more virtual disks comprises a plurality of virtual disks, the method further comprising: linking the new second virtual disk to a virtual disk in the chain of the one or more virtual disk adjacent to the last virtual disk.

5. The method of claim 4, wherein the desired state is associated with an environment for application installation.

6. The method of claim 1, further comprising:
   receiving a request to clone the second VM to produce a third VM;
   determining that the new second virtual disk exceeds a threshold size; and
   responsive to determining that the new second virtual disk exceeds the threshold size, creating a third virtual disk for the third VM and linking the third virtual disk to the new second virtual disk.

7. The method of claim 1, further comprising:
   receiving a request to clone the second VM to produce a third VM;
   determining that the new second virtual disk does not exceed a threshold size; and
   responsive to determining that the new second virtual disk does not exceed the threshold size, creating a third virtual disk for the third VM by copying contents of the new second virtual disk to the third virtual disk and linking the third virtual disk to the base virtual disk.

8. A non-transitory computer readable medium storing a computer program that when executed causes one or more processors to perform the steps of:
   determining that a virtual machine (VM) satisfies a set of requirements, the VM being linked to a base virtual disk, wherein the base virtual disk includes a chain of one or more virtual disks;
   based on the determining, identifying the VM as a template VM;
   receiving a request to clone the template VM to produce a second VM that is also linked to the base virtual disk;
   determining a size of a last virtual disk in the chain;
   when it is determined that the size of the last virtual disk in the chain is below a threshold:
      creating a new first virtual disk for the second VM by copying contents of the last virtual disk in the chain to the new first virtual disk without creating a new second virtual disk for the VM; and
      linking the second VM to the new first virtual disk;
   when it is determined that the size of the last virtual disk in the chain is above the threshold:
      creating the new first virtual disk for the second VM and creating the new second virtual disk for the VM; and
      linking the second VM to the new first virtual disk and the VM to the second new virtual disk.

9. The non-transitory computer readable medium of claim 8, wherein identifying the VM as a template VM further comprises capturing the VM into a library of VMs.

10. The non-transitory computer readable medium of claim 9, wherein the computer program that when executed further causes the one or more processors to perform the steps of:

creating the virtual disk for the second VM without copying contents of the base virtual disk.

11. The non-transitory computer readable medium of claim 8, wherein the set of requirements include the VM reaching a desired state.

12. The non-transitory computer readable medium of claim 11, wherein the desired state is associated with an environment for application installation.

13. The non-transitory computer readable medium of claim 8, wherein the computer program that when executed further causes the one or more processors to perform the steps of:
receiving a request to clone the second VM to produce a third VM;
determining that the new second virtual disk exceeds a threshold size; and
responsive to determining that the new second virtual disk exceeds the threshold size, creating a third virtual disk for the third VM and linking the third virtual disk to the second virtual disk.

14. The non-transitory computer readable medium of claim 8, wherein the computer program that when executed further causes the one or more processors to perform the steps of:
receiving a request to clone the second VM to produce a third VM;
determining that the new second virtual disk does not exceed a threshold size; and
responsive to determining that the new second virtual disk does not exceed the threshold size, creating a third virtual disk for the third VM by copying contents of the new second virtual disk to the third virtual disk and linking the third virtual disk to the base virtual disk.

15. A system comprising:
a memory area comprising a library of a plurality of template virtual machines (VM); and
a processor programmed to:
determine that a VM satisfies a set of requirements, the VM being linked to a base virtual disk, wherein the base virtual disk includes a chain of one or more virtual disks;
based on the determining, identify the VM as a template VM;
capture the template VM into the library;
receive a request to clone the template VM to produce a second VM that is also linked to the base virtual disk;
determine a size of a last virtual disk in the chain;
when it is determined that the size of the last virtual disk in the chain is below a threshold:
create a new first virtual disk for the second VM by copying contents of the last virtual disk in the chain to the new first virtual disk without creating a new second virtual disk for the VM; and
link the second VM to the new first virtual disk;
when it is determined that the size of the last virtual disk in the chain is above the threshold:
creating the new first virtual disk for the second VM and creating the new second virtual disk for the VM; and
link the second VM to the new first virtual disk and the VM to the second new virtual disk.

16. The system of claim 15, wherein identifying the VM as a template VM further comprises capturing the VM into a library of VMs.

17. The system of claim 16, wherein the processor is further programmed to:
receive a request to revert the VM to a state of the template VM captured in the library of VMs;
create a third virtual disk for the template VM without copying contents of the base virtual disk to the third virtual disk; and
link the third virtual disk to the base virtual disk.

18. The system of claim 15, wherein the set of requirements include the VM reaching a desired state.

19. The system of claim 18, wherein the desired state is associated with an environment for application installation.

20. The system of claim 15, wherein the processor is further programmed to:
receive a request to clone the second VM to produce a third VM;
determine whether the new second virtual disk exceeds a threshold size; and
responsive to determining that the new second virtual disk exceeds the threshold size, creating a third virtual disk for the third VM and linking the third virtual disk to the base virtual disk; or
responsive to determining that the new second virtual disk does not exceed the threshold size, creating a third virtual disk for the third VM by copying contents of the new second virtual disk to the third virtual disk and linking the third virtual disk to the new second virtual disk.

* * * * *